United States Patent Office 2,855,578
Patented Oct. 7, 1958

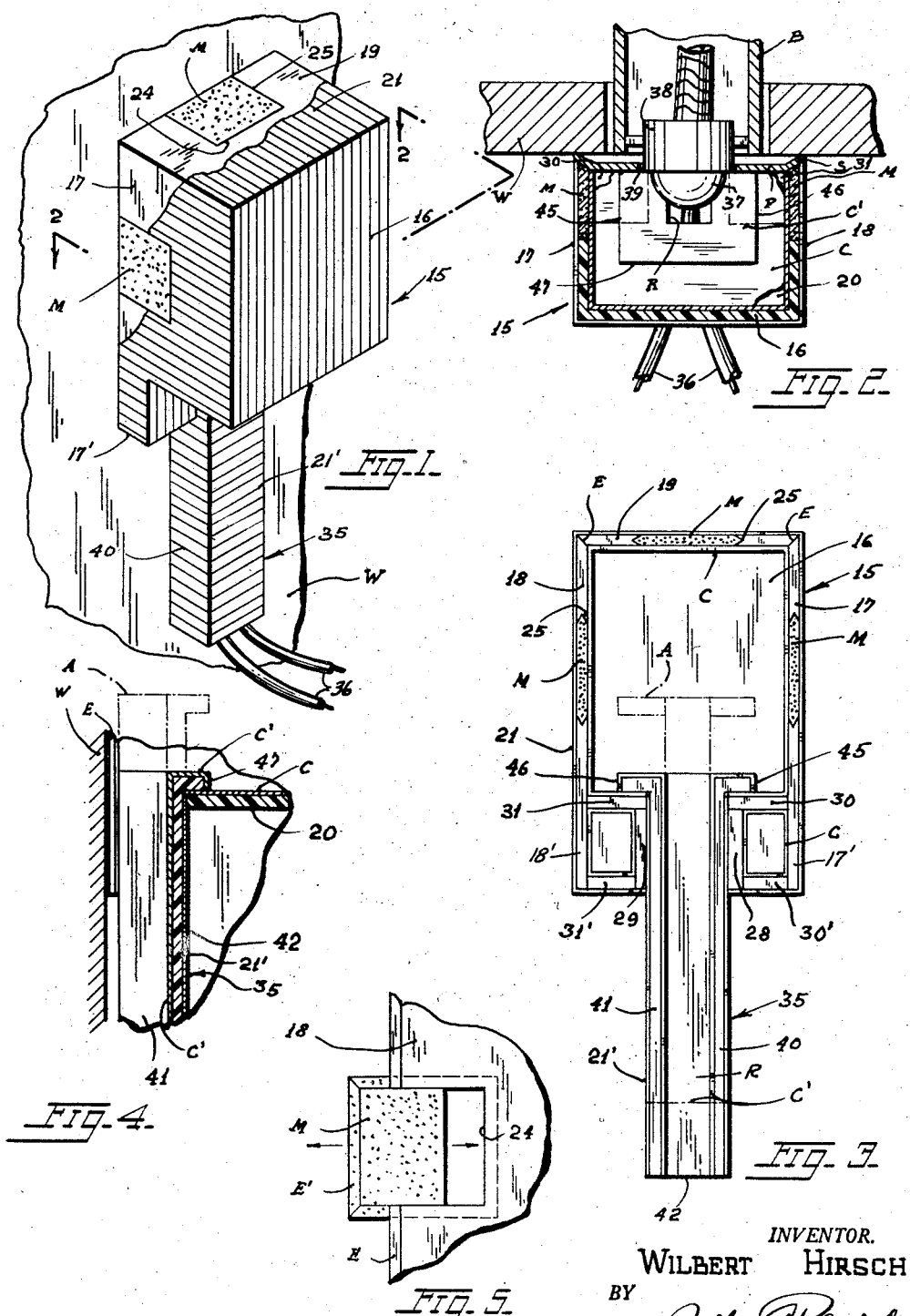

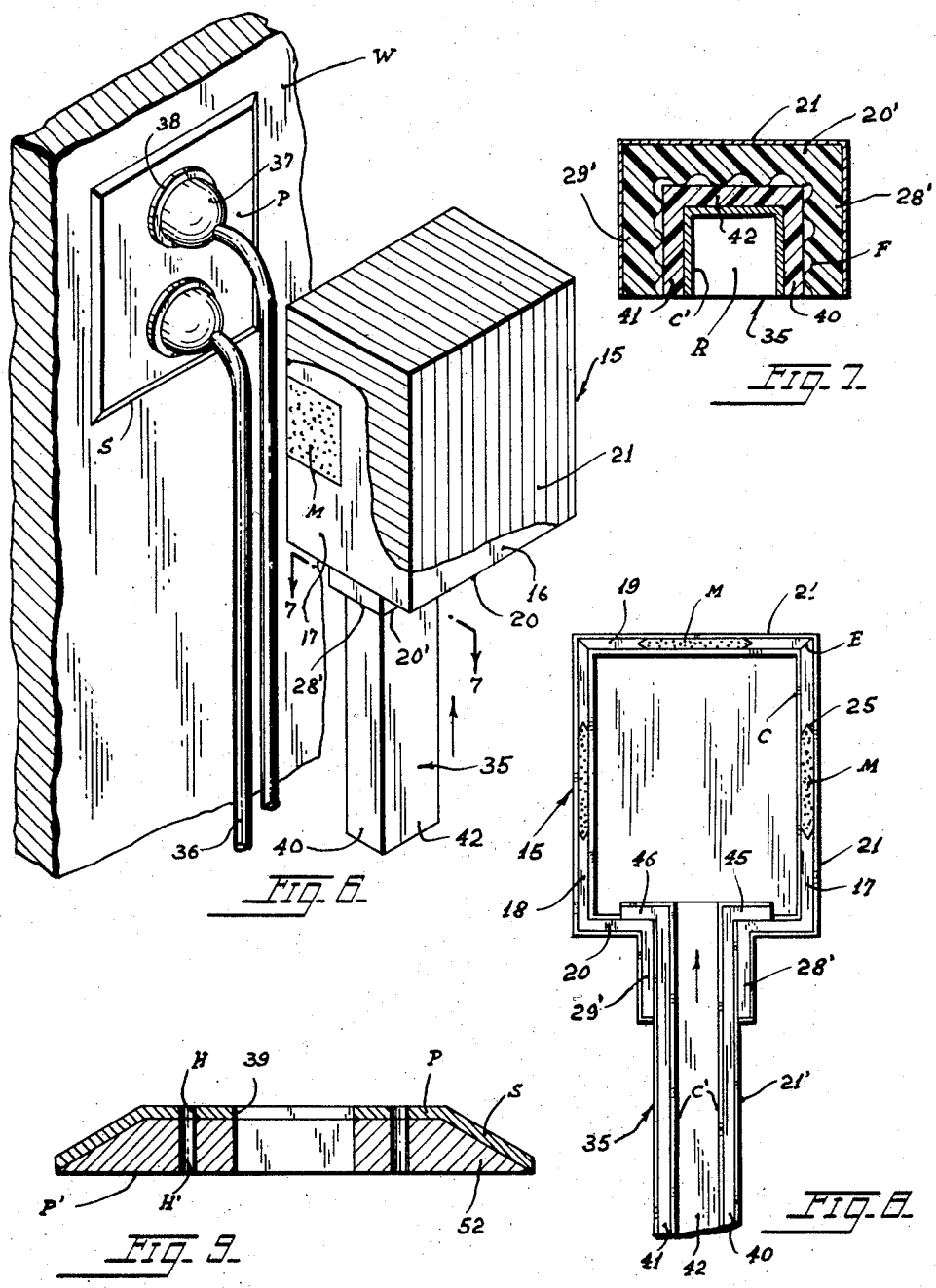

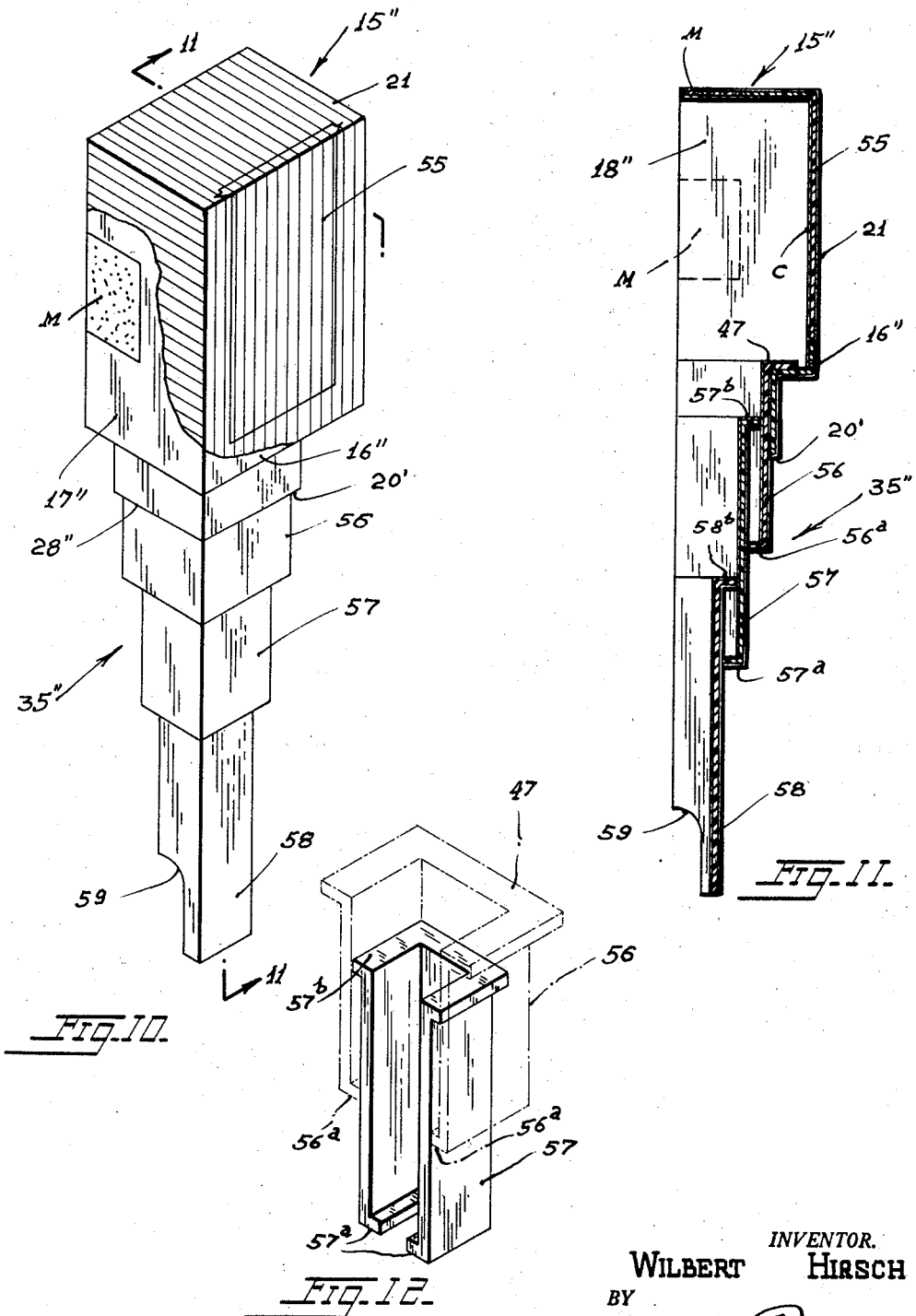

2,855,578

PROTECTIVE COVER FOR ELECTRICAL WIRING AND OUTLETS

Wilbert Hirsch, Brooklyn, N. Y.

Application June 26, 1956, Serial No. 593,946

3 Claims. (Cl. 339—36)

This invention relates to a safety cover for a standard type of electrical receptacle as commonly employed in electrical wiring systems to provide plug-in utility outlets at various locations.

It is common practice to leave utility plug-in outlets of electrical wiring systems exposed so that plug-in connections may be quickly and conveniently made. However, since such outlets are generally located in or near the baseboards on the interior walls of houses, they constitute a potential danger to young children who are attracted to the outlets and often probe into the outlet openings and the spaces between plugs with fingers or pins.

Various types of protective shields or covers for these plug-in outlets have been devised heretofore. These prior devices have failed to conceal the outlets and plugs inserted into them sufficiently to insure that the visual attraction to young children and even to household pets is minimized.

It is therefore a principal object to provide a protective cover for an electrical receptacle which wholly conceals the receptacle and any plug which may be inserted therein.

It is a further object to provide a protective cover of the character described which is substantially fireproof.

It is a further object to provide a protective cover for a household electrical receptacle which cover is capable of low cost manufacture since it is primarily molded from relatively inexpensive plastic material.

It is a further object to provide a quickly detachable protective cover for a plug-in electrical outlet and including means for concealing any plugs and adjacent portions of the connected utility cords inserted in the outlet.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a protective device embodying the invention, parts being shown broken away.

Fig. 2 is a sectional view taken on lines 2—2 of Fig. 1.

Fig. 3 is a rear elevational view of the device.

Fig. 4 is a fragmentary longitudinal sectional view of a slidable channel member as mounted in the device.

Fig. 5 is a detail side elevational view of the device, parts being shown in section.

Fig. 6 is a modified perspective view of the device.

Fig. 7 is a sectional view taken on lines 7—7 of Fig. 6.

Fig. 8 is a rear elevational view of Fig. 6.

Fig. 9 is a transverse sectional view of a receptacle cover plate with a magnetic insert.

Fig. 10 is a perspective view of the device, showing another form of the invention.

Fig. 11 is a vertical sectional view taken of line 11—11 of Fig. 10.

Fig. 12 is a fragmentary detail perspective view.

The device shown in Figs. 1–5 includes a substantially cubical hollow housing or casing or cover 15 having an outer front wall 16, side walls 17, 18, to a top wall 19 and a bottom wall 20. The rear of the casing is open. The casing may be made of an opaque plastic material or it may be coated with an opaque paint. Such a coating 21 is indicated in Fig. 1 where the casing walls are lined to indicate a colored surface.

In each of walls 17, 18, 19 is a rectangular slot 24 having channeled or grooved sides 25. In each of these slots is disposed a rectangular plate M made of permanent magnetic material and having ends shaped to fit snugly in the grooved sides 25. The outer or rear edges E of walls 17, 18, 19, as well as the corresponding edges E' of the plates M are chamfered or beveled to fit corresponding beveled or inclined edges S of the conventional outlet cover plate P. Attached to or integral with the casing 15 are a pair of depending rectangular guide plate members 28, 29. These plate members are disposed parallel to walls 17 and 18, respectively. The plate members are spaced inwardly from walls 17, 18 and are joined to walls 17, 18 by bridging plate members 30, 31 and 30', 31'. Plates 30 and 30' are joined by an extension 17' of wall 17, and plates 31 and 31' by an extension 18' of wall 18. The entire interior of casing 15 is covered with a coating C of a fireproof substance such as asbestos paint. The plate members 28—31 are similarly coated. A channel member 35 is slidably disposed between plate members 28, 29. This channel member is substantially U-shaped in cross section and provides a passage R through which the wires 36 attached to plugs 37 may be passed. Plugs 37 are inserted in receptacles 38 which extend through apertures 39 in plate P. The receptacles are supported in box B which is mounted in wall W in conventional manner. The channel member 35 has side walls 40, 41 and an outer or front wall 42. This member may be made of an opaque plastic material in the same manner as casing 15 or it may be coated with an opaque paint layer 21'. The interior of the channel member is coated with fireproof insulation material C'.

Instead of coating the interior of this device, the entire casing 15 may be made of a suitable fireproof plastic material.

At the upper ends of walls 40, 41, 42 are ledges 45, 46, 47, respectively. These ledges engage on plate members 30, 31 and bottom wall 20 so that the channel cannot slide out of the casing. The channel is snugly fitted so that it frictionally engages the guide walls. The channel member is axially adjustable as indicated by the dotted line positions A shown in Figs. 3 and 4.

In use, the device will be readily attached to plate P if plates M are magnets. Plate P should be made of such material as will be attracted by magnets M. If plate P is not a magnetic material, then a rectangular plate P' with beveled sides 52, as shown in Fig. 9, may be disposed in the recess in plate P. This plate P' will have screw holes H' registering with screw holes H in plate P. Plate P' will be composed of a suitable magnetic material. As an alternative, the plate P' may be a magnet and the members M may be composed of a magnetizable material to be attracted to the magnet P'. The members M must of course be very snugly fitted in slots 24 so that they do not slide out when the casing is lifted off the plate P. The slidably adjustable channel member 35 should be set at such a length that wires 36 issue close to the floor (not shown) adjoining the wall or baseboard W.

In Figs. 6, 7 and 8 is shown a modification of the invention in which the guide member for channel member 35 is formed by walls 28', 29' and 20'. These walls are integrally formed on and depend from bottom wall 20. The rear of the channel member 35 and of the casing 15 is open as in the device of Figs. 1–5 so that the casing may be attached to plate P and the passage R is provided between wall W and the channel member 35. The inner surfaces F of guide members 20', 28' and 29' may be roughened or corrugated to increase the frictional contact between walls 40—42 of the guide member and the walls of the channel member 35.

In Figs. 1 and 6 the paint covering 21 is partly removed to expose the walls of the casing. The paint covering is removed from the channel member 35 in Fig. 6 to expose the walls of the channel member. In general these paint coatings will be used only if the casing and channel member is made of a transparent plastic material. If the casing and channel member are made of opaque plastic material then the opaque coatings may not be required.

The device described provides complete concealment for the plugs 37 and the adjacent connected portions of electrical cords 36. Remote portions of the cords may be concealed in a suitable manner such as beneath floor carpets or the like. Immediate access is provided to the plugs 37 when desired since the device is easily taken off and replaced on the wall. The bottom open end of channel member 35 provides a concealed ventilation means for the device. Plastic members 15 and 35 are economically molded by mass production methods. Plates M may be formed of compressed powdered iron. Plate P' may be a metal stamping which is made of a magnetic material and is either magnetized or not depending on whether plates M are magnetized.

In Figs. 10–12, the front wall 16" of casing 15" is shown with a vertically slidable door 55 to allow the plugs 37 to be removed from the receptacle 38 without removing the casing 15". In this form of the invention the channel member 35" is shown to be made of a plurality of telescopic members 56, 57 and 58, provided with end flanges 56$^a$ and 57$^a$ respectively at the bottom ends and with top flanges 57$^b$ and 58$^b$, respectively which will serve as abutments for limiting the extended sliding movements of the telescopic members.

The bottommost member 58 is formed with a cutout portion 59 adopted to by-pass the bottom wall moldings.

With this arrangement the channel member 35" may be extended to the floor to cover the wires 36 when the receptacle 38 is located at various heights from the floor.

In other respects this form of the invention is similar to the previous form and the various parts may be recognized by corresponding reference numerals.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A protective device for an electrical outlet, comprising a cover plate for said outlet having beveled edges, a hollow plastic housing having an open side with beveled edges disposed over said plate, said housing having slots in the side walls thereof, a plurality of magnetic plates disposed in said slots in the side walls of said housing and having beveled edges disposed in alignment with the beveled edges of said open side, and a channel member slidably disposed in a side wall of said housing disposed adjacent the supporting wall for the device for concealing wires connected to plugs inserted in said outlet, and means on the inner end of the channel member to prevent its withdrawal from said housing.

2. A protective cover for an electrical outlet having a rectangular cover plate with beveled edges, comprising a cubical hollow plastic housing having an open side with beveled edges to fit over said plate, said housing having slots in its top and side walls and an opening in its bottom wall, portions of said edges being formed by plates of magnetizable material inserted in the slots in the top and side walls of the housing, a slidable channel member extending through the opening in the bottom wall adjacent the supporting wall for the outlet and supported in said housing by frictional contact with guide plates depending from a wall of said housing, means for holding said channel member in the housing, said guide plates having internal corrugated walls and being arranged in a generally U-shaped configuration at the exterior of the channel member, and magnetizable material associated with the cover plate and disposed adjacent to said plates of magnetizable material.

3. A protective cover for an electrical outlet, comprising a rectangular cover plate with beveled edges, said cover plate having a recess therein and having a slot therein for the reception of conventional wall plugs, a cubical hollow plastic housing having an open side with beveled edges to fit over said plate, said housing having slots in its top and side walls and an opening in its bottom wall, portions of said edges being disposed at ends of flat plates formed of magnetic material, in the housing slots, a channel member slidably disposed in the opening in said bottom wall adjacent the supporting wall for the outlet for concealing wires connected to the plugs in the cover plate slot, means for holding said channel member in the housing and another rectangular plate of magnetizable material disposed in the recess in said rectangular cover plate for attraction to said flat plates.

References Cited in the file of this patent

UNITED STATES PATENTS

| | | |
|---|---|---|
| 640,532 | Byers | Jan. 2, 1900 |
| 1,624,547 | Frederickson | Apr. 12, 1927 |
| 2,234,982 | Ross | Mar. 18, 1941 |
| 2,298,313 | Ross | Oct. 13, 1942 |
| 2,709,198 | Holthouser | May 24, 1955 |
| 2,738,475 | Beach | Mar. 13, 1956 |
| 2,732,531 | Janowiec | Jan. 24, 1956 |